United States Patent

Hilber

[11] 4,153,267
[45] May 8, 1979

[54] WHEELS FOR LAND VEHICLES SUCH AS MOTORCYCLES

[75] Inventor: Johann Hilber, Hochberg, Fed. Rep. of Germany

[73] Assignee: Kreidler Werke GmbH, Fed. Rep. of Germany

[21] Appl. No.: 831,041

[22] Filed: Sep. 6, 1977

[30] Foreign Application Priority Data

Sep. 10, 1976 [DE] Fed. Rep. of Germany ....... 2640843

[51] Int. Cl.² .................... B62K 11/02; B60B 1/14
[52] U.S. Cl. .................... 280/281 R; 301/9 DP; 301/65; 301/74; 301/104; D12/110; D12/205
[58] Field of Search .................... 280/281 R, 281 W; 180/29, 30, 31; 301/9 DP, 10 R, 10 DC, 12 R, 65, 66, 69, 74, 82, 95, 104, 105; D12/110, 205, 209, 211

[56] References Cited

U.S. PATENT DOCUMENTS

| D. 235,431 | 6/1975 | Scott | D12/211 |
| 3,635,529 | 1/1972 | Nass | 301/65 |
| 3,695,729 | 10/1972 | Schwerdhofer | 301/74 |
| 4,046,425 | 9/1977 | Sardinha | 301/12 R |
| 4,047,764 | 9/1977 | Lester | 301/105 R |

OTHER PUBLICATIONS

"The Backpocket Bicycle Book," Don Earnest, Warner Paperback Library, New York, 1973, p. 133.

*Primary Examiner*—Joseph F. Peters, Jr.
*Assistant Examiner*—Donn McGiehan
*Attorney, Agent, or Firm*—Steinberg & Blake

[57] ABSTRACT

A land vehicle such as a motorcycle has front and rear wheels which support the frame of the vehicle. The front and rear wheels are of substantially the same diameter and each include a hub, spokes, and a rim. The spokes of the rear wheel are substantially identical with the spokes of the front wheel and the spokes of each wheel are uniformly distributed about the axis thereof. However, the rear wheel has a number of spokes which is greater than the number of spokes of the front wheel.

13 Claims, 8 Drawing Figures

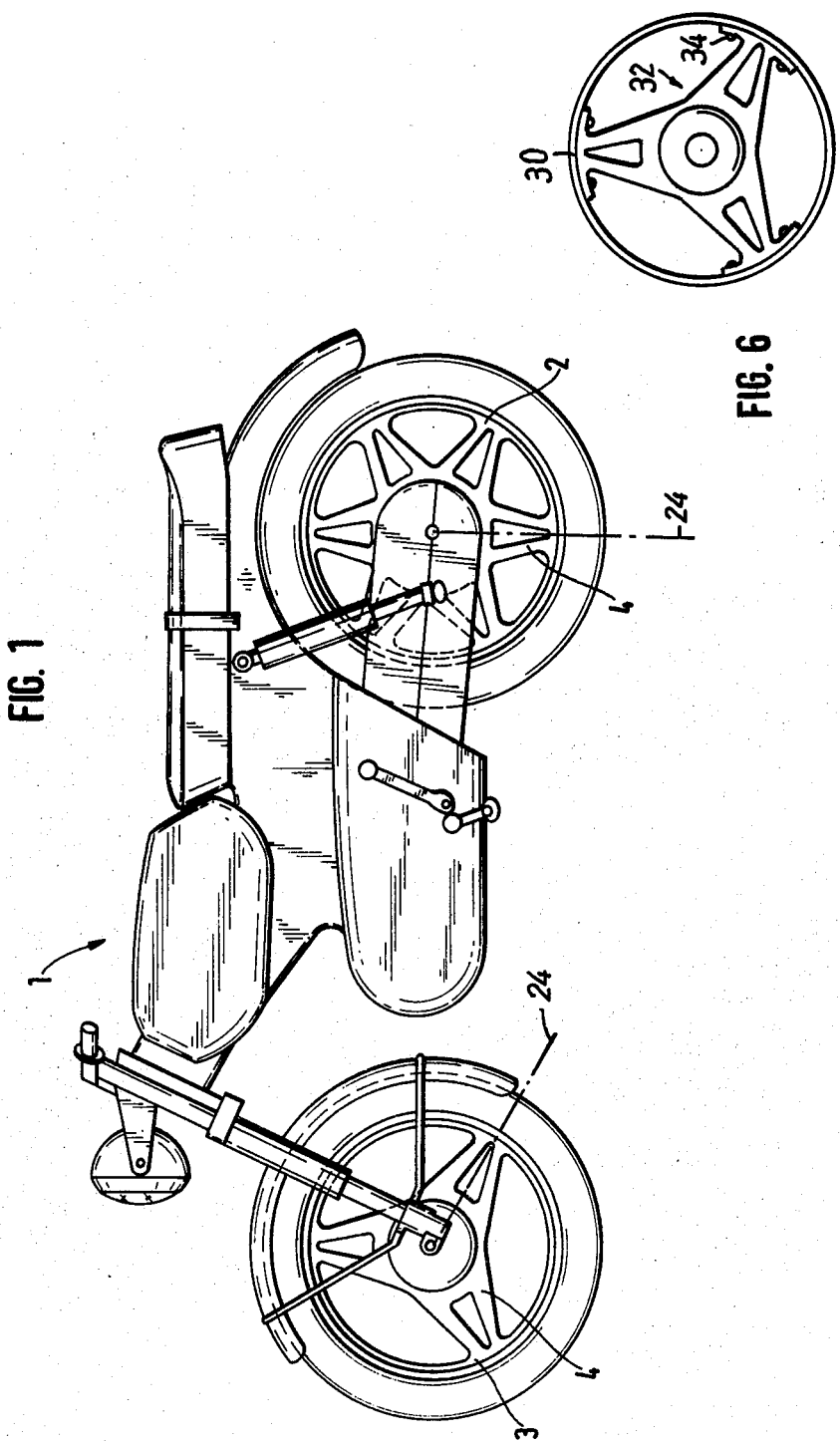

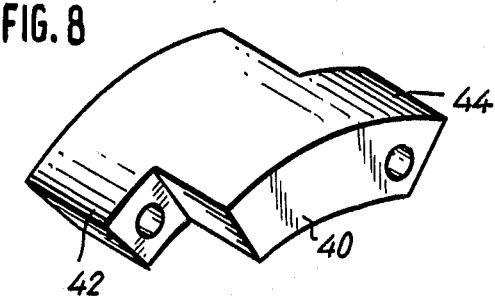
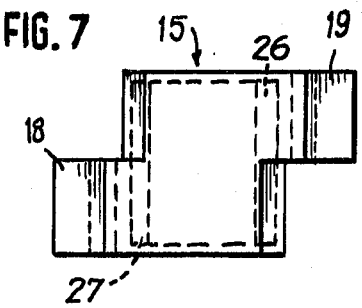
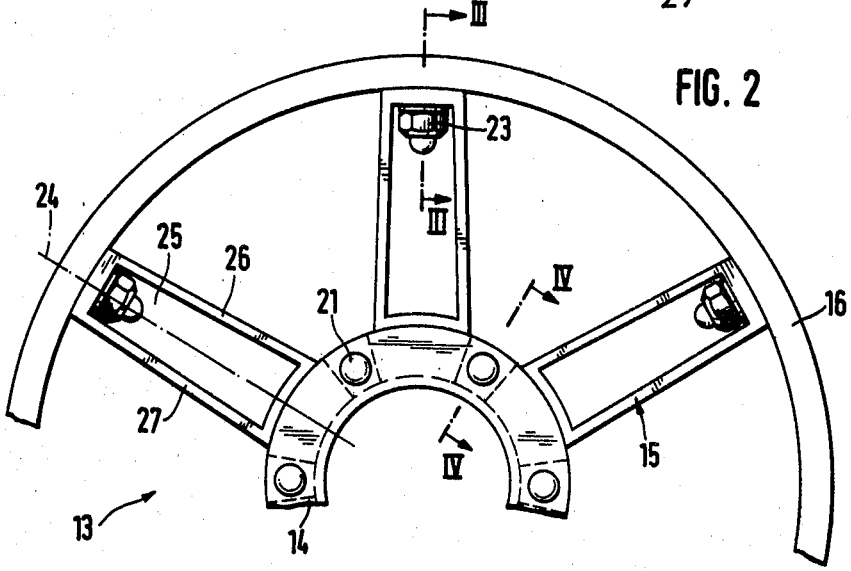
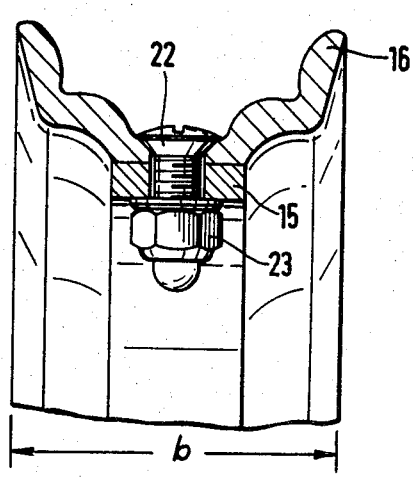
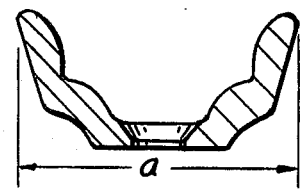
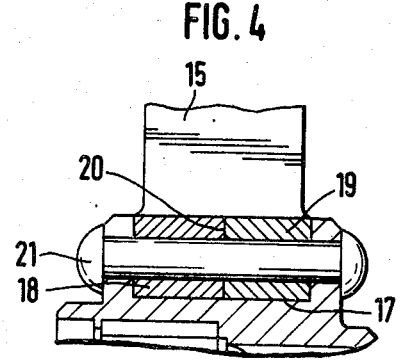

WHEELS FOR LAND VEHICLES SUCH AS MOTORCYCLES

BACKGROUND OF THE INVENTION

The present invention relates to land vehicles such as motorcycles.

More particularly, the present invention relates to land vehicles of the above type where each wheel includes a hub, spokes, and rim, with the wheels being of approximately the same diameter and with both wheels having substantially identical spokes which are uniformly distributed about the axis of each wheel.

In land vehicles of the two-wheel type, such as motorcycles, the weight of the operator creates at the rear wheel a load which is at least twice as great as the load on the front wheel. If such a vehicle is, as is conventional, provided with identical front and rear wheels the materials used for the vehicle and the time used in manufacturing the same are unnecessarily great.

SUMMARY OF THE INVENTION

It is accordingly a primary object of the present invention to make use of the above factor of the greater weight being applied to the rear wheel rather than the front wheel of the vehicle in such a way as to reduce the cost of manufacture of the wheels of the vehicle while at the same time reducing the weight of the vehicle.

In addition it is an object of the present invention to provide a vehicle such as a motorcycle with a construction according to which there is not only a saving in weight but also a reduction in the amount of material required for the vehicle and a reduction in the costs involved in the manufacture of the vehicle.

In accordance with the invention, the rear wheel has a larger number of spokes than the front wheel. Inasmuch as the load on the rear wheel is approximately double that on the front wheel, it is preferred to provide the rear wheel with a number of spokes which is twice as great as the number of spokes of the front wheel. In this way it is possible not only to save weight but also to reduce the amount of material and the manufacturing costs. The advantages achieved in this way are particularly apparent in the case of wheels which are made of light metals such as an aluminum alloy, and also in connection with wheels which have a hub, spokes and rim which are separate components which are assembled together. The rim of each wheel is preferably in the form of a rolled profile made of a light metal in the form of a malleable alloy, while the spokes and hub may be made of a light metal which is cast in suitable molds. However it is also possible to provide the wheels of the vehicle with parts which are made of plastic, and this is true in particular of the spokes of the wheels of the invention.

When the vehicle of the invention has, for example, a front wheel which has three spokes, then the rear wheel will, in accordance with the invention, have six spokes which are identical with the spokes of the front wheel. With the construction of the invention the wheels are fully capable of withstanding impact stresses even at the highest speeds without being damaged. Even though the front wheel of the vehicle has a small number of spokes, nevertheless a stable operation of the vehicle is assured, as a result of the features included in the wheels of the invention.

According to one possible structure of the invention the hub of each wheel is formed with a circumferential groove which receives with a close fit inner ends of the spokes, these inner ends being fastened to the hub by way of fasteners which are parallel to the axis of the wheel. The inner and side surfaces of the hub groove are engaged by the spokes which transmit directly to the hub the radial and axial forces which act on the wheel, without, however, loading the fasteners. These fasteners serve with the structure of the invention primarily to transfer forces which act circumferentially and thus the fasteners are subject only to shearing stresses. These circumferential forces are much greater at the rear wheel than the front wheel, particularly since the rear wheel is the driven wheel. For these reasons also it is advantageous to provide the rear wheel with more spokes than the front wheel.

The connection of the spokes to the hub is improved by reason of a further feature of the invention according to which each pair of adjoining spokes has within the hub groove portions which overlap each other, the fasteners which fasten the spokes to the hub passing through the overlapping portions of the spokes.

In order to achieve a symmetrical loading of each wheel, the overlapping portions of the spokes engage each other at an interface or separating plane which is normal to the axis of the wheel and situated midway between the opposed ends of the wheel. This plane which contains the interface of the overlapping portions of the spokes also bisects the spokes themselves. The spokes may be fastened to the rim with radially extending fastening elements, whereas the fastening elements which fasten the spokes to the hub are parallel to the wheel axis, as pointed out above.

BRIEF DESCRIPTION OF DRAWINGS

The invention is illustrated by way of example in the accompanying drawings which form part of this application and in which:

FIG. 1 is a schematic side elevation of a land vehicle of the invention;

FIG. 2 is a fragmentary side elevation of part of a wheel of the invention;

FIG. 3 is a fragmentary section, at a scale larger than FIG. 2, taken along line III—III of FIG. 2 in the direction of the arrow;

FIG. 4 is a fragmentary section at a scale larger than FIG. 2 taken along line IV—IV of FIG. 2 in the direction of the arrows;

FIG. 5 is a transverse section of a front wheel rim to illustrate according to one feature of the invention the size of the front wheel rim as compared with the rear wheel rim;

FIG. 6 shows another embodiment of the invention where the rim is separate from the spokes and hub;

FIG. 7 shows one of the spokes of FIG. 2 as it appears when looking toward the inner circumferential surface of the spoke from the axis of the wheel; and FIG. 8 is a perspective illustration of a spacer which may be used instead of a spoke.

DESCRIPTION OF PREFERRED EMBODIMENTS

Referring now to FIG. 1, there is illustrated therein a land vehicle of the invention, in the form of a motorcycle which includes a frame means 1 which includes components by means of which the frame means 1 is carried by the illustrated rear wheel 2 and front wheel 3, suitable shock absorbers, springs, or the like, being provided for giving to the frame means a springy mounting on the wheels. Each of the wheels 2 and 3 includes a hub, spokes, and rim which together form a unitary body made in one piece and preferably being cast from a light metal such as an aluminum alloy. It will be seen that in the illustrated example the rear wheel 2 has six spokes 4, while the front wheel 3 has three spokes 4. In all other respects the wheels 2 and 3 are identical. The spokes 4 of each wheel are uniformly distributed about the axis thereof with each spoke having a plane of symmetry 24 on opposite sides of which each spoke has a pair of elongated members which are spaced from each other and which project outwardly from the hub toward the rim.

However, it also possible to provide a construction as shown in FIG. 6 according to which each wheel has an outer rim 30 which is separate from a unitary one-piece body 32 which is made up of the hub and spokes. In this case the spokes have at their outer ends extensions capable of receiving fasteners 34 which serve to fasten the body 32 to the rim 30, these fasteners 34 extending radially with respect to the axis of the wheel shown in FIG. 6.

According to the embodiment of the invention which is illustrated in FIGS. 2–4, each wheel 13 of the vehicle is also made of a light metal such as an aluminum alloy in the same way as the embodiments of FIGS. 1 and 6. However, in the embodiments of FIGS. 2–4, the hub, spokes and rim are all separate components which are assembled together. The hub 14 is formed with an outer circumferential groove 17 which is of a substantially U-shaped cross section, as shown in FIG. 4. In the illustrated example which is to serve as a rear wheel, the groove 17 receives the inner end regions of six spokes 15 with a close fit. Moreover, each spoke 15 is machined at the opposite ends of the inner portions received in the grooves 17 so that each spoke will have a pair of projections 18 and 19, as shown in FIG. 7. Thus, each spoke has at one end and on one side a projection 18 and at the other side a projection 19. When the spokes are introduced into the groove 17, the projections 18 of the spokes overlap and engage the projections 19 of adjoining spokes with these projections having a size and configuration according to which the entire groove 17 will be filled both circumferentially and axially, as well as radially, as is apparent from FIG. 4.

The adjoining projections 18 and 19 of a pair of adjoining spokes 15 engage each other at a separating plane or interface 20, which is shown in FIG. 4. The plane which contains the interface 20 is normal to the wheel axis and is situated midway between the opposed ends of the wheel, this plane also bisecting the spokes. Thus, the plane which contains the interface 20 is situated midway between the opposed ends of the hub 14.

By providing each spoke with the projections 18 and 19 at opposite sides it is possible to utilize identical constructions for all of the spokes.

The projections 18 and 19 are formed with bores passing transversely therethrough, and these bores become aligned with each other when the projections 18 and 19 of a pair of adjoining spokes 15 overlap each other, so that in this way it is possible to pass through the bores of the projections 18 and 19 fasteners such as the fastener 21 shown in FIG. 4.

Thus, in the illustrated example, each pair of overlapping spoke projections 18 and 19 is traversed by a rivet 21 which is parallel to the wheel axis and which passes through the side walls of the hub between which the groove 17 is formed. Instead of utilizing rivets 21, however, it is also possible to utilize bolts and nuts, and in some cases it is possible to eliminate the bores in the overlapping projections and instead to fasten the spokes to the hub by gluing the spokes and hub to each other.

The spokes 15 are fastened to the rim 16 by way of bolts 22 which pass through aligned radially extending openings of the rim and spokes, as shown in FIG. 3. The bolts 22 have nuts 23 threaded onto the bolts 22 at their inner ends which extend inwardly beyond the outer end walls of the spokes 15. However, in this case also it is possible to utilize rivets instead of the bolts and nuts.

In the illustrated example each spoke 15 is a form of double-spoke in that it has a pair of elongated portions 26 and 27 which extend outwardly from the inner portion which is received in the groove 17 toward the outer end wall which is fastened to the rim, each spoke 15 thus surrounding a hollow space 25 which is of a substantially trapezoidal configuration, as illustrated in FIG. 2. Of course, the elongated parts 26 and 27 are situated equidistantly from the plane of symmetry 24 which is indicated in FIG. 2. This plane of symmetry of course extends radially with respect to the wheel axis. If desired, the elongated portions 26 and 27 may be provided with inner elongated reinforcing ribs which extend into the space 25.

In the case of FIG. 2, the wheel includes six spokes and will preferably serve as a rear wheel. When this construction is to be used as a front wheel, there will be only three spokes 15, as pointed out above, in this event the successive spokes will not directly engage each other since it preferred to provide them with a construction identical with the six spokes which are used for the wheel of FIG. 2. Thus with such a construction spacers 40 shown in FIG. 8 are situated between the successive spokes. Each spacer 40 has a construction identical with the inner portion of each spoke 15 which is received in the groove, so that the spacers 40 will mate properly with successive spokes and will be joined thereto in the same way as described above. Thus it will be seen that each spacer 40 has at its opposite sides a pair of end projections 42 and 44 respectively corresponding to and being identical with the projections 18 and 19.

According to a further feature of the invention while the construction of the front and rear wheels are substantially identical except that the rear wheel has more spokes than the front wheel, nevertheless it is also possible to provide the front wheel with a rim which axially has a dimension smaller than the rim of the rear wheel. Thus, FIG. 5 fragmentarily illustrates a rim 16' of a front wheel which has an axial dimension a which is smaller than the axial dimension b shown in FIG. 3 for the rim 16 of the rear wheel.

As has been pointed out above, it is possible simply to adhere the spokes to the rim with a suitable glue, for example, and it is also possible to provide such an adhesive type of connection between the spokes and the rim.

Moreover, where the entire wheel is made of a single one-piece body, as shown in FIG. 1, the wheel may be made not only of a light metal but also of plastic. This is true also of the embodiment of FIG. 6 where the one-piece unit 32 which includes the hub and spoke as well as the rim 30 may both be made of a plastic material or a light metal such as an aluminum alloy.

What is claimed is:
1. In a land vehicle, such as a motorcycle, a front wheel, a rear wheel situated behind said front wheel, and frame means extending between and supported by said front and rear wheels, said front and rear wheels being of approximately the same diameter and each including a hub, spokes, and a rim, said hub, spokes and rim comprising separate components which are assembled together, the hub and spokes being formed of a light cast metal the spokes of said rear wheel being substantially identical with the spokes of said front wheel, and each wheel having a central axis around which the spokes of each wheel are uniformly distributed, and the number of spokes of said rear wheel being approximately twice the number of spokes of said front wheel.

2. The combination of claim 1 and wherein said light metal is an aluminum alloy.

3. The combination of claim 1 and wherein said rear wheel has six spokes while said front wheel has three spokes.

4. The combination of claim 1 and wherein each spoke of each wheel has a plane of symmetry which extends radially with respect to each wheel and each spoke having on opposite sides of said plane of symmetry a pair of elongated portions which are spaced from each other and which extend outwardly from said hub toward said rim.

5. The combination of claim 1 and wherein said rim of said rear wheel is wider than said rim of said front wheel.

6. The combination of claim 1 and wherein the hubs of said wheels form a pair of members and the rims of said wheels form a pair of members, and at least one of said pairs of members having the same dimensions.

7. The combination of claim 1 and wherein the rims of said wheels are made of a malleable alloy and are in the form of rolled profiles while said spokes and hubs are made of alloys which are cast.

8. The combination of claim 1 and wherein each hub of each wheel is formed with an outer circumferential groove, and each spoke of each wheel having an inner end situated within said groove of said hub of each wheel and extending completely across said groove to have a close fit therewith.

9. The combination of claim 1 further including a plurality of elongated fasteners fastening said spokes on the one hand to said hub and on the other hand to said rim, each wheel having a central axis and the fasteners which fasten said spokes to said hub being parallel to the latter axis while the fasteners which fasten said spokes to said rim extending radially with respect to said axis.

10. The combination of claim 1 and wherein said hub and rim of each wheel forming a pair of elements at least one of which is glued to the spokes.

11. The combination of claim 1 and wherein the hub of each wheel is formed with a circumferential groove while the spokes of each wheel extend into said groove with a close fit, said spokes respectively having inner end regions situated in said groove, and the inner end regions of adjacent spokes partially overlapping each other, and fasteners fastening said spokes to said hub and extending through the overlapping parts of said spokes.

12. In a land vehicle, such as a motorcycle, a front wheel, a rear wheel situated behind said front wheel, and frame means extending between and supported by said front and rear wheels, each wheel including a hub, spokes, and a rim, said hub being formed with a circumferential groove while the spokes extend into said groove with a close fit, said spokes having inner end regions situated in said groove, and the inner end regions of adjacent spokes partially overlapping each other and fasteners fastening said spokes to said hub and extending through the overlapping parts of said spoke.

13. In a wheel for a land vehicle, the combination comprising a hub, spokes, and a rim, said hub being formed with a circumferential groove while the spokes extend into said groove with a close fit, said spokes having inner end regions situated in said groove, and the inner end regions of adjacent spokes partially overlapping each other and fasteners fastening said spokes to said hub and extending through the overlapping parts of said spokes.

* * * * *